United States Patent
Ugrani et al.

(10) Patent No.: US 10,621,976 B2
(45) Date of Patent: Apr. 14, 2020

(54) INTENT CLASSIFICATION FROM MULTIPLE SOURCES WHEN BUILDING A CONVERSATIONAL SYSTEM

(71) Applicant: INTERNATIONAL BUSINESS MACHINES CORPORATION, Armonk, NY (US)

(72) Inventors: Rajendra G. Ugrani, Union City, NJ (US); Neil R. Mallinar, Long Island City, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 23 days.

(21) Appl. No.: 16/134,895

(22) Filed: Sep. 18, 2018

(65) Prior Publication Data
US 2020/0090638 A1   Mar. 19, 2020

(51) Int. Cl.
| | |
|---|---|
| G10L 15/00 | (2013.01) |
| G10L 15/06 | (2013.01) |
| G10L 15/18 | (2013.01) |
| G06N 20/00 | (2019.01) |
| G06F 16/338 | (2019.01) |
| G06F 16/35 | (2019.01) |
| G06F 16/33 | (2019.01) |
| G10L 15/02 | (2006.01) |
| G10L 15/08 | (2006.01) |

(52) U.S. Cl.
CPC .......... *G10L 15/063* (2013.01); *G06F 16/338* (2019.01); *G06F 16/3344* (2019.01); *G06F 16/353* (2019.01); *G06N 20/00* (2019.01); *G10L 15/1815* (2013.01); *G10L 15/02* (2013.01); *G10L 15/08* (2013.01)

(58) Field of Classification Search
CPC combination set(s) only.
See application file for complete search history.

(56) References Cited

U.S. PATENT DOCUMENTS

2015/0279360 A1* 10/2015 Mengibar ............... G10L 15/18
704/257

* cited by examiner

*Primary Examiner* — Vu B Hang
(74) *Attorney, Agent, or Firm* — Griffiths & Seaton PLLC (57) ABSTRACT

Embodiments for training a conversational system using intent classification are provided. Example utterances recommended to be associated with a particular semantic scope of intent are received from a plurality of sources. Respective ones of the example utterances from the plurality of sources are portioned and stored in a plurality of pools. The respective example utterances from the plurality of pools are collated into a unified pool according to weighting assigned to each one of the plurality of pools, the weighting associated with user actions taken on the respective example utterances. A unified set of the example utterances from the unified pool is output for selection by the user to train an intent classifier associated with the semantic scope of intent for the conversational system.

21 Claims, 6 Drawing Sheets

INTENT CLASSIFICATION FROM MULTIPLE SOURCES WHEN BUILDING A CONVERSATIONAL SYSTEM

BACKGROUND OF THE INVENTION

Field of the Invention

The present invention relates in general to computing systems, and more particularly, to various embodiments for training conversational systems with intent data from multiple sources.

Description of the Related Art

Customer contact center systems provide support for customers of a particular product or service by allowing those users to make requests for service that can include a question posed by the user related to the product or service. Generally speaking, these systems receive requests for service in various forms (e.g., in the form of a phone call, web page form, instant message, email, etc.), and route the requests to either a virtual agent or live, human agent for addressing the request and providing an answer to the question. For example, a chat or other interactive session can be conducted between the customer or client and an automated virtual agent which guides the interaction based on a set of scripts and a knowledgebase related to the topic of the contact. In other cases, a chat session can be initiated between the customer and the live agent who can interact directly with the customer over any one or more of the available channels (e.g., web chat, instant message, email exchange, etc.).

SUMMARY OF THE INVENTION

Various embodiments including a method for training a conversational system using intent classification in a computing environment are provided. Example utterances recommended to be associated with a particular semantic scope of intent are received from a plurality of sources. Respective ones of the example utterances from the plurality of sources are portioned and stored in a plurality of pools. The respective example utterances from the plurality of pools are collated into a unified pool according to weighting assigned to each one of the plurality of pools, the weighting associated with user actions taken on the respective example utterances. A unified set of the example utterances from the unified pool is output for selection by the user to train an intent classifier associated with the semantic scope of intent for the conversational system.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, in contemporary customer contact centers (among other locations of implementations), the conversational systems therein provide support for customers of a particular product or service by allowing those users to make requests for service that can include a question posed by the user related to the product or service. In some cases, a chat session can be initiated between the customer or client and a live agent (e.g., a human operator) or a virtual agent (e.g., a chat bot operated by a computing system) who can interact directly with the customer over any one or more available channels (e.g., web chat, instant message, email exchange, etc.). In the case of relying more on virtual agents, often times a substantial obstacle to overcome when interacting with human customers or clients is ascertaining by the virtual agent what the underlying intent is of a query or statement posed by human customer or client.

Inherently, humans ask questions or utter statements in different semantic variances notwithstanding the intent of the question or statement in selected cases are similar. The intent in a conversational model is therefore a concept that represents a set of semantically similar sentences for which the same response is suitable in a dialog. For example, one client may pose the question "How can I reset my internet account", while another may state "I need to reset my internet password". These questions/statements, each of which the intent would be fairly easily understood to be more or less equivalent by a human operator, may trigger a variety of responses from virtual agents. In one scenario, the virtual agent may interpret "resetting the internet account" question as a query regarding the resetting of the client's internet service in general (e.g., resetting a modem or router associated with their account), where the client's actual intent was the same as the other client requesting a password reset to get into their internet (billing) account, as in the latter example. A vast variety of examples exist like these in which virtual agents must be trained to offer accurate results to the client when provided with utterances of such variety.

Modern conversational systems recognize this limitation and attempt to create intent models by recognizing statistical classifiers trained with sample utterances. That is, intent classification in conversational systems relies on a statistical model trained with enough example utterances (i.e., sentences) per intent such that the meaning of the intent is well-defined by those examples. Users/administrators often create the intents by collecting and annotating many utterances with their respective scope of intent through the training classifier, which is a labor-intensive process. This often results in the user providing a few sample utterances themselves, and sourcing additional examples through multiple other sources and methods. These sources/methods may range from crowd-sourcing to the implementation of machine learning techniques.

Within each method and source, there is usually a well-defined metric for how accurate of an example recommendation the user is receiving. Two examples of this are crowd-sourcing, where the count of the number of workers whom agree that the recommendation is a relevant example is used; and machine learning techniques, where a score ranking a given set of recommendations is calculated against some set of ground truth examples (e.g., using cosine distance, distance to hyperplane, posterior probability, etc. computations).

When there are more than one such source of receiving example recommendations (i.e., example utterances), it becomes pertinent for the user to determine which source to use or how to intermix recommendations between the various sources. While data collation from multiple sources is an understood challenge in various statistical arts, most prior art is limited in that the methods chosen are highly domain-specific and trained given sufficient prior knowledge and understanding of the environment and all variables included. This sort of modeling requires much human effort and collaboration from data analytics/science experts and domain experts. Moreover, in conversational systems, it is generally found that users would not have experts readily available or the time themselves to model complex dependencies between data sources. Further, modern data-driven systems need to track changes that are made in a clean manner so information can be pulled for analysis and bulk learning. This need for version controlling is prominent in most systems and is often ignored in common data collation designs, which mostly rely on fixed datasets from fixed sources.

Accordingly, the functionality disclosed herein provides a framework for, given multiple ways of sourcing recommendations: storing example utterances recommended as being associated with a specific intent in a database, tracking versions of the recommended example utterances in time as separate sets (hereafter referred to as "pools"); retrieving a unified set of the recommended example utterances from multiple pools; and collating recommended example utterances within this unified set through a (optionally user-defined) rank-and-merge function. The initial strategy utilizes a fuzzy-ranking selection method (which can self-improve from user decisions), but as aforementioned, the framework provides a general placeholder for any function to take its place.

In other words, given a specific intent being considered (input) into the conversational system, the mechanisms of the present invention store sourced example utterances recommended as being associated with the specific intent efficiently such that they can be retrieved individually and as a pool by timestamp (according to the version), given that each user action (e.g., addition/deletion of an example utterance from the intent) can result in a new pool of recommended example utterances. The system also provides a generic placeholder function, hereafter referred to as the "rank-and-merge" function which retrieves pools of recommended example utterances from multiple sources and outputs a unified (i.e., collated) list of the recommended utterances, with an explicit rank-order, containing examples from all of the sources according to weighting used by virtue of previously selected example utterances chosen per source. A user may then use this output list of unified recommended utterances to further choose examples therein to train the intent classifier for the given intent more accurately, given the quality of the recommended utterances displayed as chosen per source.

This systematic process provides several advantages over known systems used in the art. When building an intent, a user often makes many small and quick additions as they test their conversational agent (i.e., chatbot) and finds cases that are not handled. Given any injective method (also referred to as a one-to-one function) of sourcing example recommended utterances that takes as input a set of existing examples in an intent, the recommendation output set changes when the input example set changes. Given the set of resulting recommended utterances frequently changes as a user builds an intent, it is important for a data collation function to be adaptive and not require data-specific modeling nor extensive time and expertise to maintain.

To address these requirements, the collated and unified list sourced from multiple methods/sources of the present invention provides a self-updating method that does not require any user decisions outside of choosing new recommended example utterances to add to the intent they are building (which is the action they are already performing). In addition, the present system tracks the history of user decisions and recommendation pools in a clean fashion for later analysis. This is a fast and streamlined method and provides a significant improvement to building out modular conversational systems, as the conversational systems are able to immediately learn to provide more accurate recommended utterances based on user actions, while maintaining these user actions in stored historical pools for learning user patterns over time.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
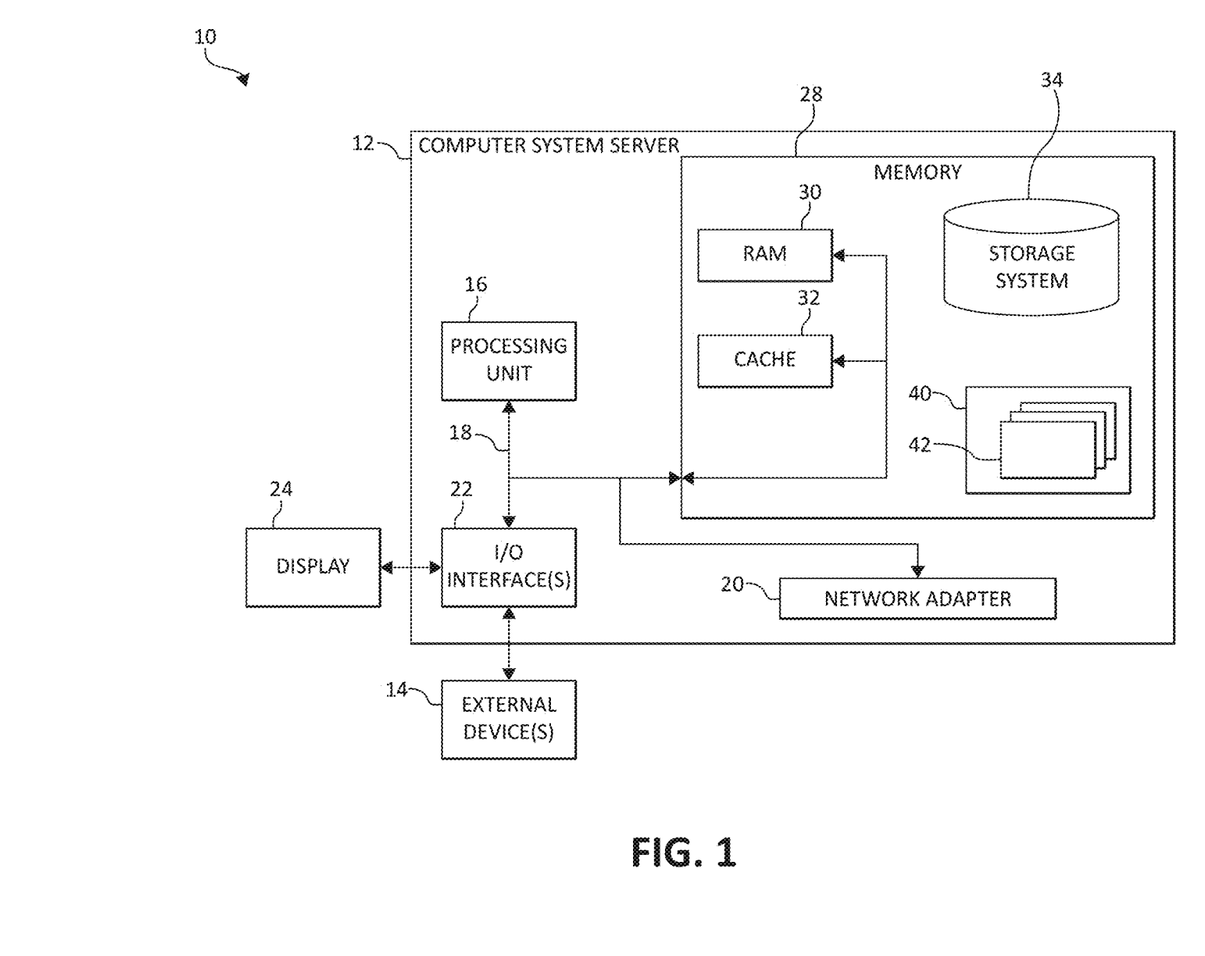
FIG. 1 is a block diagram depicting an exemplary computing node, according to embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
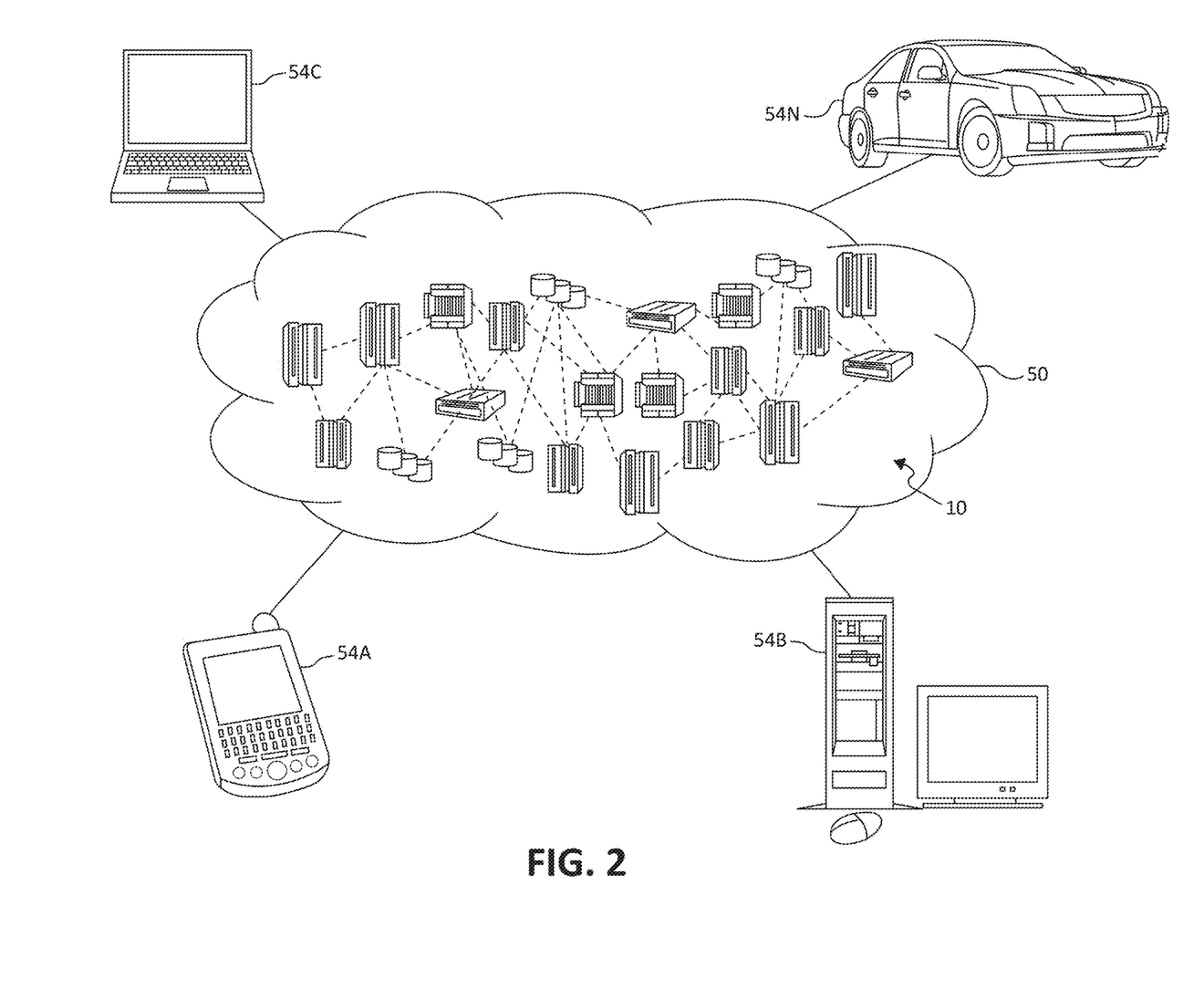
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
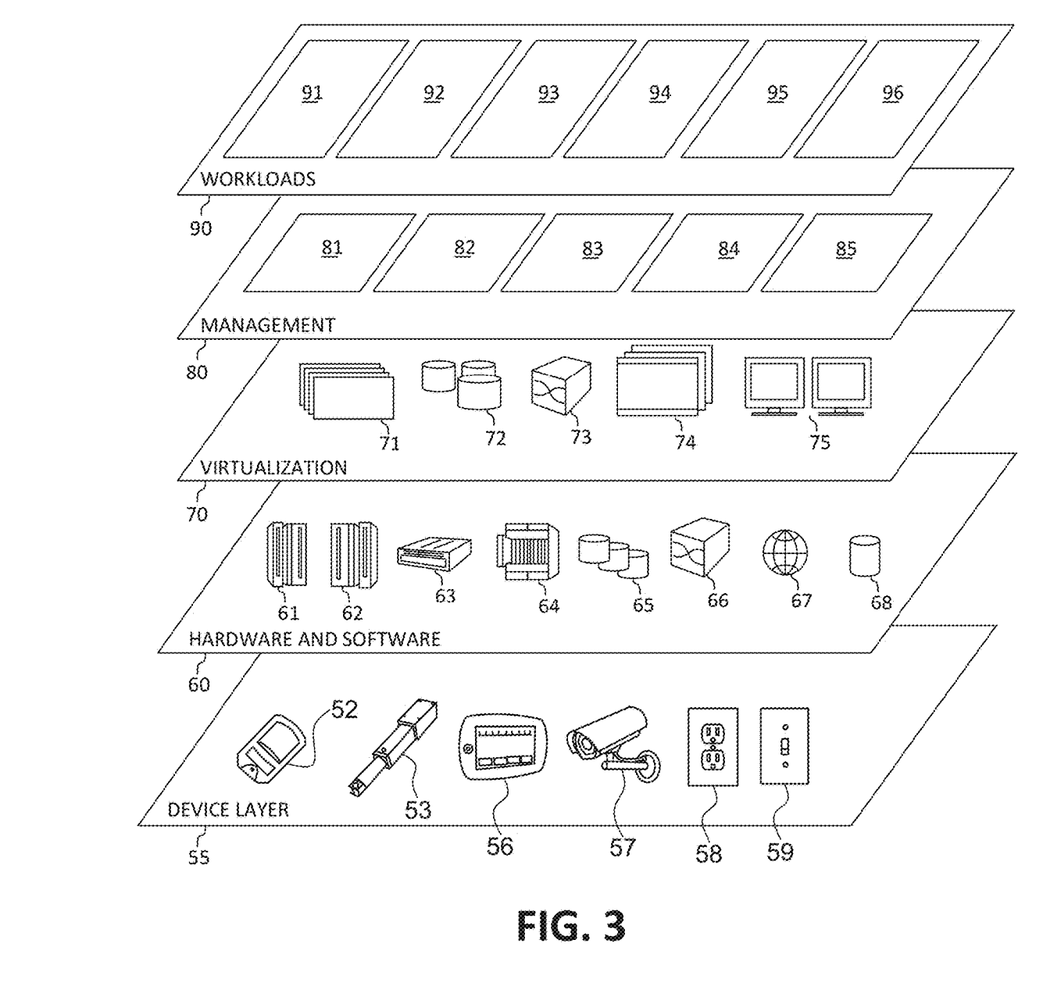
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various conversational and dialog analyzing functions 96. One of ordinary skill in the art will appreciate that the conversational and dialog analyzing functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
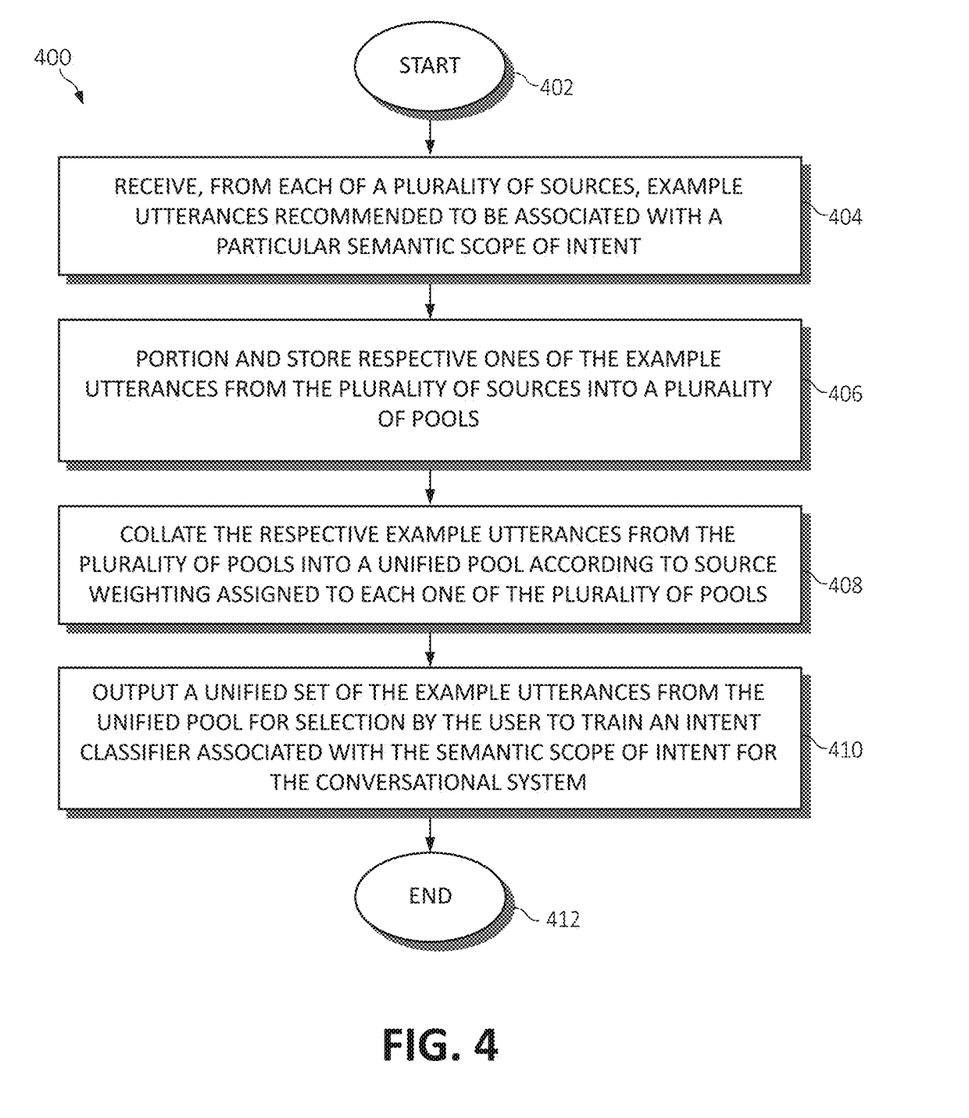
FIG. 4 is a flow chart diagram depicting a method for training a conversational system using intent classification, according to embodiments of the present invention.

Turning now to FIG. 4, a method 400 for training a conversational system using intent classification by a processor is depicted, in which various aspects of the illustrated embodiments may be implemented. The functionality 400 may be implemented as a method executed as instructions on a machine, where the instructions are embodied on a tangible, non-transitory machine-readable storage medium. The functionality 400 may start in block 402. In some embodiments, example utterances recommended to be associated with a particular semantic scope of intent are received from a plurality of sources (step 404). Respective ones of the example utterances from the plurality of sources are portioned and stored in a plurality of pools (step 406). The respective example utterances from the plurality of pools are collated into a unified pool according to weighting assigned to each one of the plurality of pools, the weighting associated with user actions taken on the respective example utterances (step 408). In other words, a weighting scheme is assigned to each pool-source based on user actions taken on the respective utterances, and if no user actions exist, a default equal weighting is applied to each pool. A unified set of the example utterances from the unified pool is output for selection by the user to train an intent classifier associated with the semantic scope of intent for the conversational system (step 410). Subsequently, the user actions taken during step 410 (i.e., selecting the respective example utterances for association or disassociation from the given intent) are used to adjust the weighting in step 408 such that subsequent example utterances selected for inclusion in the unified pool are weighted and ranked within the unified pool according to their pool-source. The method 400 ends (step 412).

Figure 5:
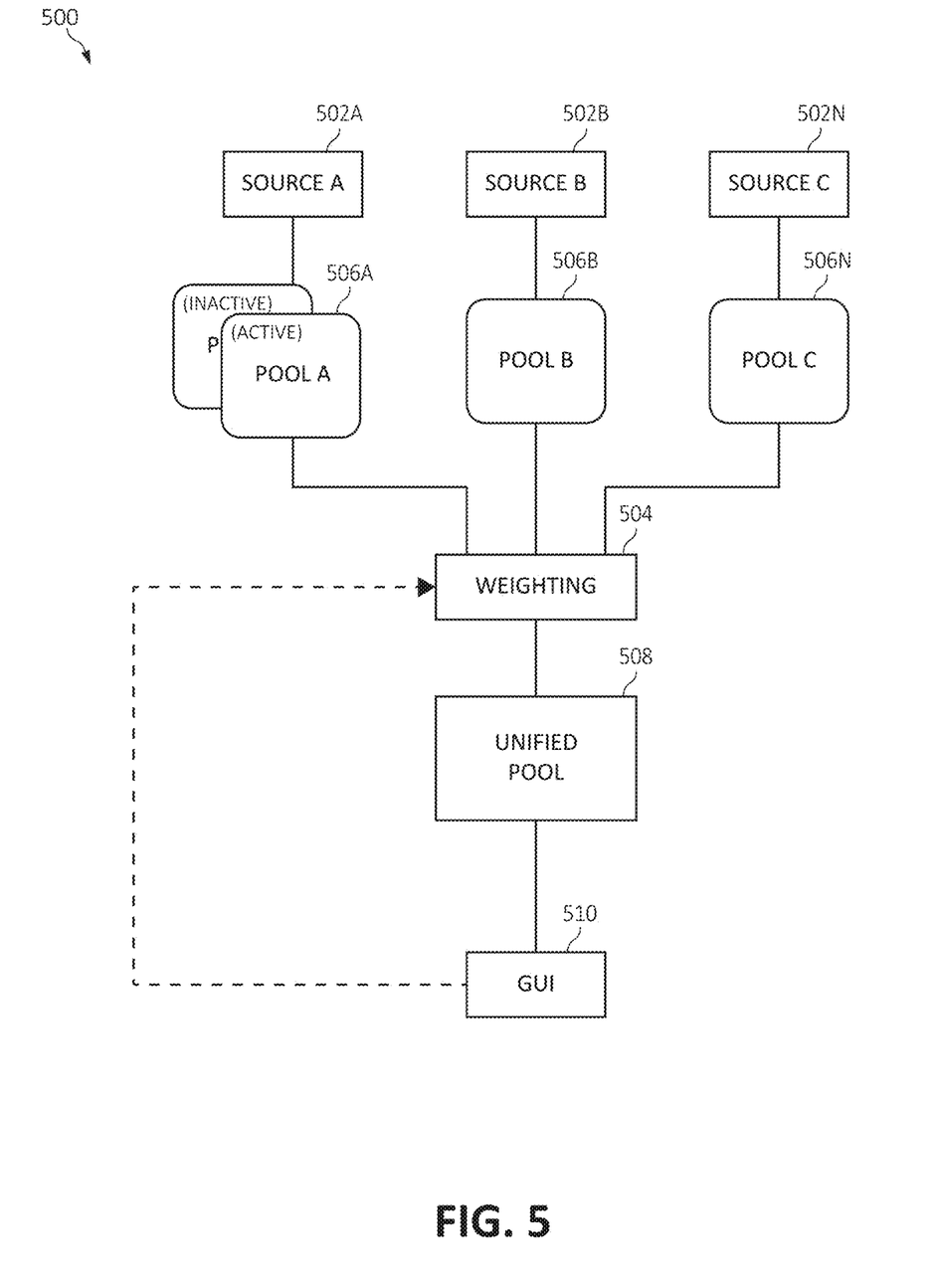
FIG. 5 is a block diagram depicting a system overview of a rank-and-merge system, according to embodiments of the present invention.

In accordance with aspects of the present invention, several functional components are considered. Referring now to FIG. 5 a system overview of a rank-and-merge system 500 is depicted. As shown, the various functions, or "modules" of functionality, hardware devices, and/or other components in the same descriptive sense as has been previously described in FIGS. 1-3 may be included in FIG. 5. For example, processing unit 16 and memory 28 of FIG. 1 may be employed in FIG. 5 to perform various computational, data processing, storage and other functionality in accordance with various aspects of the present invention.

The rank-and-merge system 500 includes multiple sources (or methods) such as source A, 502A, source B 502B, and source C 502n. These sources 502A-n may respectively include the aforementioned crowd-sourcing, machine learning, or individually selected techniques (among others) for generating recommended example utterances, which are portioned into pools according to their source 502A-n. For example, system 500 depicts pool A 506A, pool B 506B, and pool C 506n. Further, the pools 506A-n are timestamped according to their respective versions to illustrate which pool contains the most recent data. In the depicted example, pool 506A shows an active pool, however an inactive (previously generated) pool is depicted as having previously recommended example utterances. This timestamping and versioning will further be described, infra. The recommended example utterances of pools 506A-n are then collated into a unified pool 508 according to a weighting algorithm by a weighting component 504 (described infra) using various ranking techniques, and displayed to a user via a user interface (UI), which may comprise a graphical user interface (GUI) 510. Accordingly, depending on the user's selections as to which recommended example utterances are indeed associated with the given intent through input of the GUI 510, these selections provide the weighting component 504 with data as to which of the pools 506A-n using example utterances from sources 502A-n should be used to retrieve recommended example utterances during future iterations of selection.

It should be noted that each pool 506A-n must have a well-defined ranking function within itself for the system 500 to operate accurately and that most common sources of recommendations should have such a ranking defined on itself. That is, whether it be through crowd-sourcing or machine learning methods, these sources must themselves have defined ranking functionality which generates the recommended example utterances, as the system 500 merely collates the output recommendations of each source.

Next defined are three such rank-and-merge functions: a naïve baseline; a fuzzy-ranking; and ensemble merging. The mechanisms of the present invention implement the fuzzy-ranking method, as this method is considered a self-improving function. The baseline for the weighting component 504 first establishes a source-based ranking (e.g. "source A 502A" is always preferable to "source B 502B" which is always preferable to "source C 502n", etc.). According to the ranking provided by the weighting component 504, a re-ordered list of all recommended example utterances is output, first ordering pools 502A-n by their source-ranking, and then ranking within each pool by ordering the recommended example utterances therein by their in-pool ranking.

The fuzzy-ranking method defines a constant set of buckets for each of the pools 502A-n and shuffles together recommended example utterances from each bucket into the output unified pool 508. For example, if each bucket for each pool 502A-n contains 5 examples and there are three pools, then each bucket of the output unified pool 508 will contain fifteen examples (being the three sets of five which are shuffled together in random order, hence the fuzziness of this rank-and-merge function).

The ensemble method simply takes an agreement percentage as a parameter and outputs a unified pool 508 of recommended example utterances such that each utterance of this unified pool 508 has shown up in a greater proportion of the methods than the agreement percentage. Commonly a simple majority is used for this method, meaning the agreement percentage is 50%.

In the described embodiment, a user can override any of the default rank-and-merge functions with respective other one, giving them the opportunity to include prior knowledge about the various methods of sourcing recommendations into the process. Thus, these mechanisms provide learning and self-improvement for the fuzzy-ranking function, in which user choices of recommended example utterances presented to them through the GUI 510 (in the unified pool 508) are tracked. Based on ratios of how many recommended example utterances a user chooses per source 502A-n, the fuzzy-ranking method automatically updates to put higher weight on sources 502A-n that are chosen more frequently through use of the weighting component 504.

Figure 6:
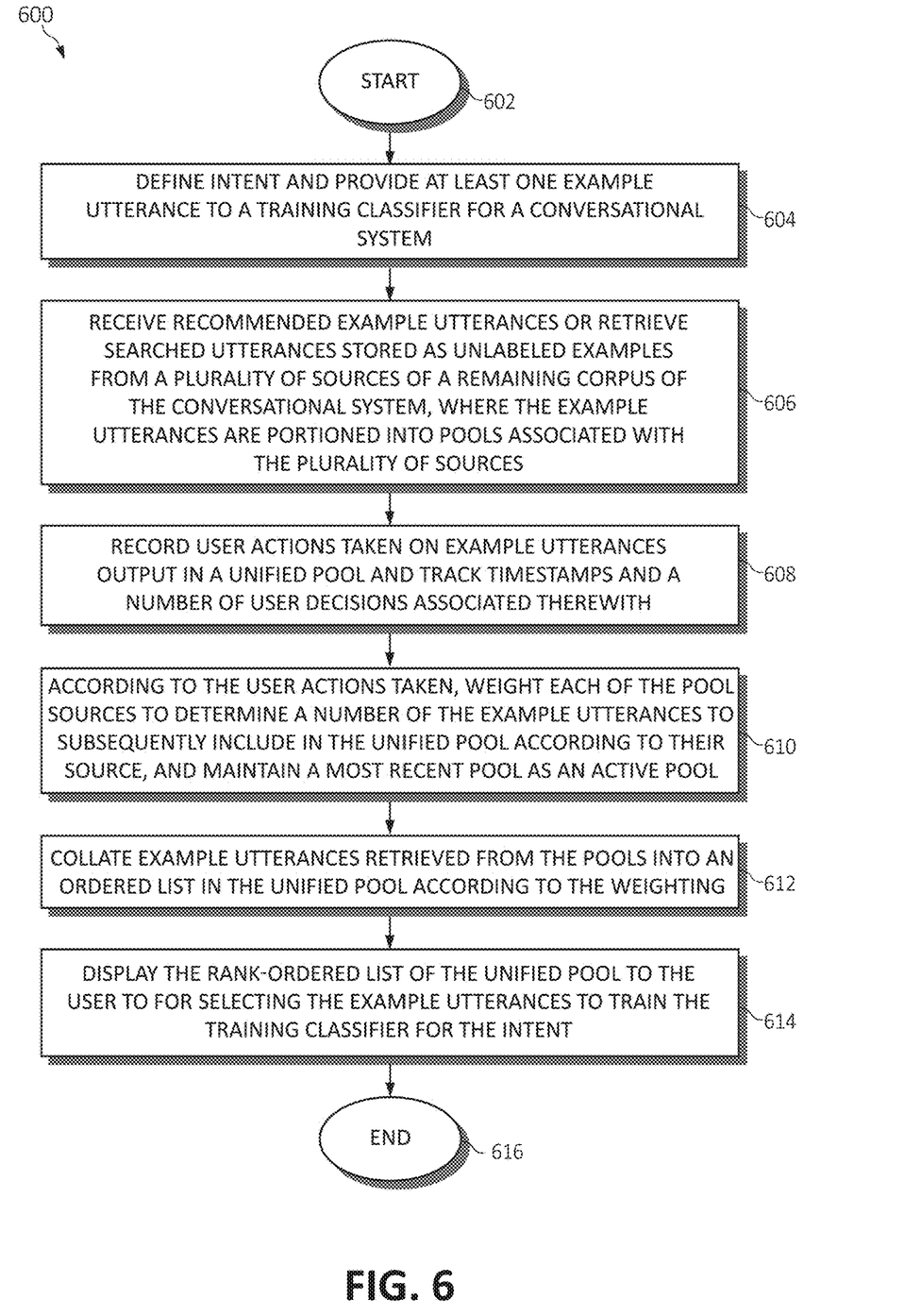
FIG. 6 is a flow chart diagram depicting an additional method for training a conversational system using intent classification, according to embodiments of the present invention.

Referring now to FIG. 6, a flow diagram illustrating a method 600 for training a conversational system using intent classification is depicted. The functionality 600 may be implemented as a method executed as instructions on a machine, where the instructions are embodied on a tangible, non-transitory machine-readable storage medium. The method 600 may start in block 602. The method 600 first assumes that a specific intent has been defined and at least one example utterance has been provided to an intent classifier for the conversational system (step 604). Once the specific intent has been input and the at least one example utterance (i.e., textual example sentence) has been provided to the intent classifier, the mechanisms of the present invention then implement the clean storage, retrieval, ranking, and collation of additional recommended example utterances for selection by the user according to the intent. In one embodiment, the additional recommended example utterances may be retrieved from a user or a plurality of users (e.g., through crowd-sourcing), or from a conversational corpus (e.g., chatlogs, etc.).

As aforementioned, it is assumed an intent classifier, A, has been previously trained such that the intent classifier A has been trained on intent sets {I_1, I_2, . . . }, where each intent I_j contains some set of example utterances {E_j1, E_j2, . . . } previously input. The training classifier A may be utilized within a conversational system in which there are stored unlabeled example utterances from a conversational corpus (e.g., s chatlog history, hereafter referred to as C) that a user can label and add to an intent within the intent classifier A (hereafter defined as a user action), and that each of those user actions is stored and logged into a database that is accessible via an application programming interface (API).

Thus, recommended example utterances are received according to the baseline (and/or retrieved pursuant to a user inquiry or search of the database) from the sources 502A-n as the unlabeled example utterances of the conversational corpus, where the unlabeled example utterances are portioned into the respective pools 506A-n (step 606). The user actions taken on the recommended (or retrieved from search) example utterances are recorded in the database and timestamps and a number of user actions (decisions) associated with each example utterance are tracked (e.g., which source 502A-n each user-labeled example utterance originated from, and how many example utterances per source 502A-n the user associated or disassociated with the given intent) (step 608). According to the type of user action taken (whether the user associated or disassociated the example utterance with the given intent) and the number of user actions taken on a respective example utterance or pool 506A-n, the weighting component 504 determines how to weight example utterances provided from each source 502A-n and ranking within the unified pool 508. Further, the most recent recommended example utterances are provided per pool 506A-n by maintaining an active pool associated with the timestamp tracking the user actions (step 610). The example utterances are then collated from the pools 506A-n into the unified pool 508 such that the recommended example utterances are rank-ordered per the weighting of the source 502A-n and the in-pool ranking of the pools 506A-n (step 612). This rank-ordered list is displayed to the user (via GUI 510), where the user selects through the recommended example utterances to train the intent classifier for the given intent (step 614). The method 600 ends (step 616).

In conjunction with the method 600, now provided is a set of strict definitions which illustrate in detail the disclosed system.

First defined is a set of recommended example utterances as {S_1t, S_2t, . . . }, where t is an independent timestamp tracking the number of user actions performed. Each S_kt sources recommended example utterances as a function of: (optionally) user decisions made on example utterances from C; and the set of input example utterances {E_j1, E_j2, . . . }. The set of user decisions made on examples from C is referred to as C'_{t−1}, where C'_{t−1} is always a subset of C and t is a timestamp tracking the number of user actions performed, which is aligned with the timestamp in {S_1t, S_2t, . . . } (it is explicitly chosen that {S_1t, S_2t, . . . } are defined after C'_{t−1} is defined). Next, the unified set of collated recommendations from {S_1t, S_2t, . . . } is referred to as S_t. Finally, C'_t can come from a user selecting recommended example utterances from S_t, or an alternative method of looking through C and selecting example utterances (for instance, utilizing a search engine on C and weak supervision techniques). As noted previously, the function by which the recommended example utterances are sourced must have a well-defined score in of itself, such that example recommendations can be cleanly ranked within any S_kt.

Next provided is a short set of function definitions as shortcuts for the aforementioned long-form definitions:
S_kt=get recommendations_from_method_k(C'_{t−1}, {E_j1, E_j2, . . . });
S_t=rank_and _merge({S_1t, S_2t, . . . }); and
C'_t=user_action(S_t) or user_addition _to _set({E_j1, E_j2, . . . }) or user_action(search(C)).

In various embodiments, a database design is provided that encodes the timestamp, t, as a universally unique identifier (UUID) given its inherent tracking through time, wherein a new UUID is generated for each new pool 506A-n that is generated. The schema additionally takes the example text of the utterances and a recommendation score from method_k (or each source 502A-n).

To track the active state of each pool 506A-n, a Boolean flag "active" is set to True for the newest pool of recommendations retrieved per source 502A-n, and False for all old pools (as depicted in the system 500, active/inactive pool 506A). This is performed for the sake of fast retrieval of the recommended example utterances (using one database call for retrieval by source), rather than ranking the timestamp and pulling the example utterances from the respective pool 506A-n based on the latest timestamp (which would perform two database calls). This allows for quicker retrieval in the rank_and _merge function, at the cost of negligible storage (one Boolean per recommended example utterance). Additionally, each recommended example utterance is tagged with a string "source" field, for easy differentiation of pools 506A-n on the joint ("source", "version") fields. That is, a string source field is implemented to define the source 502A-n of each recommended example utterance, and a string version field is provided having the timestamp/user actions performed (denoting the active/most recent recommendation pool). Thus, it is noted that for any recommended example utterance that has the Boolean "active" set to True, the "version" field would represent the latest version of the pool 506A-n for that given method and/or source 502A-n. This design allows a user to backtrack through all versions of the recommendation pools 506A-n in their entirety by method and by time, giving the user vital information for analysis.

The rank_and_merge function proposed is the self-learning fuzzy-ranking function. This function operates by bucketing each of $\{S\_1t, S\_2t, \ldots\}$ into $\{N\_1, N\_2, \ldots\}$ buckets such that $S\_kt[m]$ is the m'th bucket of $S\_kt$. Then, the total number of buckets of $S\_t$, N is taken to be $\max(N\_1, N\_2, \ldots)$. For ease, the method starts with $N\_1=N\_2=\ldots=N$ to enable equal sized buckets and equal weighting amongst recommendation methods/sources at the beginning of the intent classification. Then defined is $\{S\_t[1], S\_t[2], \ldots, S\_t[N]\}$ as the N buckets of $S\_t$, where each of $S\_t[m]$ contains a random shuffling of elements from $S\_kt[m]$ for all k. The number of elements to be shuffled in is $|S\_kt[m]|$ if each of $S\_kt$ contains the same number of recommended example utterances, otherwise it comprises $\min(|S\_1t[m]|, |S\_2t[m]|, \ldots)$ so that each method is equally represented in $S\_t[m]$.

This function is adapted to be self-learning as the user starts making the user action of selecting recommended example utterances from $S\_t$ (as defined above: user_action $(S\_t)$) for all previous iterations t (i.e., previous iterations of selections of the recommended example utterances). As the user makes these choices, their selections are recorded into a database and the number of recommended example utterances chosen by source 502A-n is aggregated over all previous iterations t. From these counts, it may be determined which source 502A-n is more reliable, by the users standards and for the given intent, with a simple ranking of the aggregated counts. Given this data, the ratio of the user selections per method may also be computed against the total number of elements shown as recommended example utterances (aggregated over all previous iterations of t).

Based on these ratios, the number of buckets per method is adjusted such that the better performing methods have fewer buckets (e.g., each bucket of the better performing method now contains significantly more example utterances). The number of elements sampled from each method may also be adjusted per bucket to prioritize those larger buckets from better performing methods and de-prioritize worse performing methods. For example, instead of sampling $\min(|S\_1t[m]|, |S\_2t[m]|, \ldots)$ from each method, a larger number of examples from those larger buckets in better performing methods and fewer examples from the remaining methods/sources may be used.

It should be noted that, commensurate with the context of the present invention, machine learning algorithms suitable for the disclosed functionality may comprise any statistical classifier trainable with a small number of seed utterances with user-provided or auto-propagated labels. In one aspect, the machine learning based models may be performed using a wide variety of methods or combinations of methods, such as supervised learning, unsupervised learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, and fuzzy clustering. Specific details regarding any of the examples of supervised, unsupervised, reinforcement learning, or other machine learning described in this paragraph are known and are considered to be within the scope of this disclosure.

Further, it should be noted that the present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for training a conversational system using intent classification, by a processor, comprising:
   receiving, from each of a plurality of sources, example utterances recommended to be associated with a particular semantic scope of intent;
   portioning and storing respective ones of the example utterances from the plurality of sources in a plurality of pools;
   collating the respective example utterances from the plurality of pools into a unified pool according to weighting assigned to each one of the plurality of pools, the weighting associated with user actions taken on the respective example utterances; and
   outputting a unified set of the example utterances from the unified pool for selection by the user to train an intent classifier associated with the semantic scope of intent for the conversational system.

2. The method of claim 1, wherein outputting the unified set of example utterances further includes displaying, via a user interface (UI), a list of the unified set of example utterances in a ranked order according to the weighting.

3. The method of claim 2, wherein the weighting comprises a source-ranking by which the respective pools are ordered and an in-pool ranking by which the example utterances are ordered within the respective pools.

4. The method of claim 3, wherein the example utterances are received from a conversational corpus, and further including retrieving subsequent example utterances from the conversational corpus for placement into a respective one or a new one of the plurality of pools from the plurality of sources according to source-ranking.

5. The method of claim 1, further including encoding a timestamp as a universally unique identifier (UUID) for each of the plurality of pools; and
   maintaining respective ones of the plurality of pools as active pools according to a most recent timestamp.

6. The method of claim 5, further including tagging each of the example utterances with a string source field and version field; wherein the source field describes the one of the plurality of sources from which the respective example utterance originates and the version field represents the respective active pool for the respective source.

7. The method of claim 1, further including recording the selections of the user from the unified set of the example utterances and aggregating a count of the selections per source over all previous iterations of selections; wherein the aggregate count contributes to the weighting.

8. A system for training a conversational system using intent classification, comprising:
a processor executing instructions stored in a memory device; wherein the processor:
receives, from each of a plurality of sources, example utterances recommended to be associated with a particular semantic scope of intent;
portions and stores respective ones of the example utterances from the plurality of sources in a plurality of pools;
collates the respective example utterances from the plurality of pools into a unified pool according to weighting assigned to each one of the plurality of pools, the weighting associated with user actions taken on the respective example utterances; and
outputs a unified set of the example utterances from the unified pool for selection by the user to train an intent classifier associated with the semantic scope of intent for the conversational system.

9. The system of claim 8, wherein outputting the unified set of example utterances further includes displaying, via a user interface (UI), a list of the unified set of example utterances in a ranked order according to the weighting.

10. The system of claim 9, wherein the weighting comprises a source-ranking by which the respective pools are ordered and an in-pool ranking by which the example utterances are ordered within the respective pools.

11. The system of claim 10, wherein the example utterances are received from a conversational corpus, and wherein the processor retrieves subsequent example utterances from the conversational corpus for placement into a respective one or a new one of the plurality of pools from the plurality of sources according to source-ranking.

12. The system of claim 8, wherein the processor encodes a timestamp as a universally unique identifier (UUID) for each of the plurality of pools; and
maintains respective ones of the plurality of pools as active pools according to a most recent timestamp.

13. The system of claim 12, wherein the processor tags each of the example utterances with a string source field and version field; wherein the source field describes the one of the plurality of sources from which the respective example utterance originates and the version field represents the respective active pool for the respective source.

14. The system of claim 8, wherein the processor records the selections of the user from the unified set of the example utterances and aggregating a count of the selections per source over all previous iterations of selections; wherein the aggregate count contributes to the weighting.

15. A computer program product for training a conversational system using intent classification, by a processor, the computer program product embodied on a non-transitory computer-readable storage medium having computer-readable program code portions stored therein, the computer-readable program code portions comprising:
an executable portion that receives, from each of a plurality of sources, example utterances recommended to be associated with a particular semantic scope of intent;
an executable portion that portions and stores respective ones of the example utterances from the plurality of sources in a plurality of pools;
an executable portion that collates the respective example utterances from the plurality of pools into a unified pool according to weighting assigned to each one of the plurality of pools, the weighting associated with user actions taken on the respective example utterances; and
an executable portion that outputs a unified set of the example utterances from the unified pool for selection by the user to train an intent classifier associated with the semantic scope of intent for the conversational system.

16. The computer program product of claim 15, wherein outputting the unified set of example utterances further includes displaying, via a user interface (UI), a list of the unified set of example utterances in a ranked order according to the weighting.

17. The computer program product of claim 16, wherein the weighting comprises a source-ranking by which the respective pools are ordered and an in-pool ranking by which the example utterances are ordered within the respective pools.

18. The computer program product of claim 17, wherein the example utterances are received from a conversational corpus, and further including an executable portion that retrieves subsequent example utterances from the conversational corpus for placement into a respective one or a new one of the plurality of pools from the plurality of sources according to source-ranking.

19. The computer program product of claim 15, further including an executable portion that encodes a timestamp as a universally unique identifier (UUID) for each of the plurality of pools; and
an executable portion that maintains respective ones of the plurality of pools as active pools according to a most recent timestamp.

20. The computer program product of claim 15, further including an executable portion that tags each of the example utterances with a string source field and version field; wherein the source field describes the one of the plurality of sources from which the respective example utterance originates and the version field represents the respective active pool for the respective source.

21. The computer program product of claim 15, further including an executable portion that records the selections of the user from the unified set of the example utterances and aggregating a count of the selections per source over all previous iterations of selections; wherein the aggregate count contributes to the weighting.

* * * * *